(12) United States Patent
Dhua et al.

(10) Patent No.: US 10,083,521 B1
(45) Date of Patent: Sep. 25, 2018

(54) CONTENT RECOMMENDATION BASED ON COLOR MATCH

(71) Applicant: A9.com, Inc., Palo Alto, CA (US)

(72) Inventors: Arnab Sanat Kumar Dhua, Mountain View, CA (US); Gautam Bhargava, Palo Alto, CA (US); Ketan Ramesh Deshpande, San Jose, CA (US); Ming Du, Redwood City, CA (US); Aishwarya Natesh, Mountain View, CA (US); Dheeraj Soti, San Jose, CA (US); Colin Jon Taylor, Orinda, CA (US)

(73) Assignee: A9.COM, INC., Palo Alto, CA (US)

( * ) Notice: Subject to any disclaimer, the term of this patent is extended or adjusted under 35 U.S.C. 154(b) by 285 days.

(21) Appl. No.: 14/959,968

(22) Filed: Dec. 4, 2015

(51) Int. Cl.
*G06K 9/00* (2006.01)
*G06T 7/40* (2017.01)
(Continued)

(52) U.S. Cl.
CPC .......... *G06T 7/408* (2013.01); *G06F 17/3025* (2013.01); *G06F 17/30253* (2013.01); *G06F 17/30256* (2013.01); *G06F 17/30274* (2013.01); *G06F 17/30277* (2013.01); *G06K 9/00362* (2013.01); *G06K 9/6255* (2013.01); *G06K 9/6256* (2013.01); *G06Q 30/0603* (2013.01); *G06Q 30/0631* (2013.01); *G06T 1/0007* (2013.01); *G09G 5/02* (2013.01); *G06T 2207/10024* (2013.01); *G06T 2207/20132* (2013.01); *G06T 2210/16* (2013.01)

(58) Field of Classification Search
CPC . G06T 7/408; G06T 1/0007; G06F 17/30253; G06F 17/30256; G06F 17/30274; G06F 17/30277; G06K 9/00362; G06K 9/6255; G06K 9/6256; G06Q 30/0603; G06Q 30/0631; G09G 5/02
See application file for complete search history.

(56) References Cited

U.S. PATENT DOCUMENTS

| 8,311,900 B1 * | 11/2012 | Bates ................. G06Q 30/0601 705/27.1 |
| 9,691,161 B1 * | 6/2017 | Yalniz .................... G06T 7/407 |

(Continued)

*Primary Examiner* — Sean Motsinger
(74) *Attorney, Agent, or Firm* — Hogan Lovells US LLP

(57) ABSTRACT

Approaches attempt to determine information that can help to produce more useful recommendations to be displayed in a situation where no, or little, information is available that indicates a relationship between content provided through an electronic marketplace or other content provider. For example, data available that relates to an item in a product catalog, for example color data, can be analyzed and aggregated in order to attempt to locate other items that are related and relevant to the item, at least as it relates to color and categorization of the content. Such approaches can include, for example, analyzing images, articles, and other sources of electronic content to attempt to locate items that might be relevant to the item of interest. In a clothing example, this can include accessory items that might be worn with an apparel item of interest, match the apparel item of interest, be frequently utilized or exhibited with the apparel item of interest, include a matching and/or complementary color to the apparel item of interest, etc.

20 Claims, 10 Drawing Sheets

(51) Int. Cl.
  *G06T 1/00* (2006.01)
  *G09G 5/02* (2006.01)
  *G06K 9/62* (2006.01)
  *G06Q 30/06* (2012.01)
  *G06F 17/30* (2006.01)

(56) References Cited

U.S. PATENT DOCUMENTS

| | | | | |
|---|---|---|---|---|
| 2008/0004989 A1* | 1/2008 | Yi | G06Q 30/02 | 705/26.1 |
| 2008/0082426 A1* | 4/2008 | Gokturk | G06F 17/30256 | 705/26.62 |
| 2008/0215453 A1* | 9/2008 | Yoshii | G06Q 30/02 | 705/7.29 |
| 2008/0235078 A1* | 9/2008 | Hong | G06Q 30/0256 | 705/14.54 |
| 2009/0059175 A1* | 3/2009 | Le Quesne | G06F 3/042 | 353/28 |
| 2011/0016001 A1* | 1/2011 | Schieffelin | A61B 5/0059 | 705/14.66 |
| 2011/0026835 A1* | 2/2011 | Ptucha | G06F 17/30247 | 382/209 |
| 2011/0273592 A1* | 11/2011 | Yamaoka | G06K 9/00362 | 348/239 |
| 2011/0274314 A1* | 11/2011 | Yang | G06K 9/00369 | 382/103 |
| 2013/0191409 A1* | 7/2013 | Zeng | G06F 17/3064 | 707/767 |
| 2013/0202267 A1* | 8/2013 | Khromov | H04N 21/2223 | 386/225 |
| 2014/0279246 A1* | 9/2014 | Chen | G06Q 30/0623 | 705/26.61 |
| 2014/0279289 A1* | 9/2014 | Steermann | G06Q 30/0643 | 705/27.2 |
| 2016/0358225 A1* | 12/2016 | Zhang | G06Q 30/0271 | |
| 2017/0249768 A1* | 8/2017 | Dhua | G06T 11/60 | |
| 2017/0263011 A1* | 9/2017 | Yalniz | G06T 7/42 | |
| 2017/0277948 A1* | 9/2017 | Dhua | G06K 9/00536 | |

* cited by examiner

CONTENT RECOMMENDATION BASED ON COLOR MATCH

BACKGROUND

Users are increasingly utilizing computing devices to access various types of content. For example, users may utilize a search engine to locate information about various items. Conventional approaches to locating items involve utilizing a query to obtain results matching one or more terms of the query, navigating by page or category, or other such approaches that rely primarily on a word or category used to describe an item. Such approaches can make it difficult to locate items based on appearance or aesthetic criteria, such as a specific pattern or color of material. Approaches do exist to display related information such as recommendations along with the items to allow for locating an appropriate item. For example, if the user is viewing content for a specific item, for example, the provider might cause content for one or more other items to be recommended to the user, where the recommendations are generated using information such as products that were viewed and/or purchased previously by the user. For new users, or users who have not yet logged in or been identified, there will be no such information available on which to base recommendations. The recommendations will solely be based on information such as items in the same category or similar items, which will not provide the optimal experience for the user, and will result in the use of resources to display content that may not be of interest to the user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining content to be provided for a user in an electronic environment. In particular, various embodiments analyze images from various sources to attempt to recognize items that may be able to be associated in some way, such as clothing that may be worn together, items that may be arranged together as part of a display, or other such relations that may not otherwise be discernible from descriptive information available in an electronic catalog. In some cases, the images can include celebrities, models, designers, or other persons wearing items or otherwise exhibiting items that can be associated together. For example, a person desiring to purchase a particular outfit might wear other goods that are determined to match the particular outfit, such as an accessory in a complimentary color. Various approaches for segmenting images, determining visual features based on colors, patterns, and other visual arrangements represented in the images can be utilized to determine descriptors such as various color descriptors for various items to recommend items in response to a query or other such occurrence.

Various other functions and advantages are described and suggested below as may be provided in accordance with the various embodiments.

Figure 1A:
FIGS. 1A and 1B illustrate example displays of content including recommendations that can be provided in accordance with various embodiments.
Figure 1B:
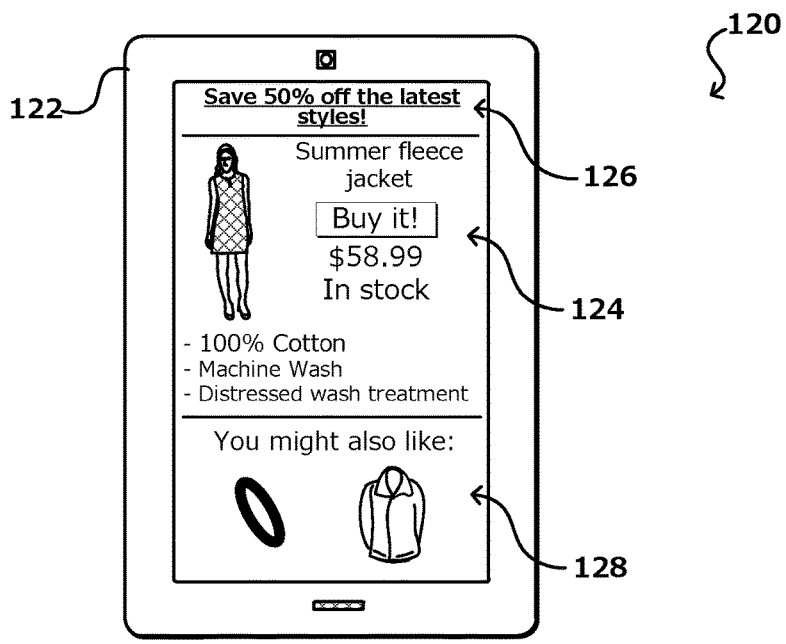

FIG. 1A illustrates an example display 100 of content that can be presented in accordance with various embodiments. In this example, a user of an electronic marketplace (or other such source of electronic content) has requested a page of content corresponding to a dress of interest to the user. The content can include, for example, an image 102 of the dress, a description 104 of the dress, an option 106 to purchase the dress, and other such information or content. The page could have been accessed through a variety of different approaches, such as may be a result of a received search query, browse, or navigation request, among other such options. As illustrated, the display 100 also includes an advertisement 108 displayed with the content. The advertisement might be provided with the content, or the code (e.g., HTML, XML, CSS, etc.) for displaying the content might include code causing one or more advertisements to be obtained from a third party and displayed with the content, according to any restrictions set by the content provider. The advertising might be selected based upon various factors, such as may include information about the object 102 of interest, or information for similar objects that may be of interest to the user. Similarly, the display 100 includes a set of recommendations 110 that include content for related objects that may be of interest to the user. The recommendations can be determined using various criteria that can be the same as, or at least partially different from, those used to select the advertising 108. In this example, the objects 110 recommended are from the same category as the object of interest 102, such as a clothing category, and include a common or at least complementary color. While a Web browser interface is shown as an example in FIG. 1A, it should be understood that other types of interfaces or displays of content can be presented as well, such as the interface 120 displayed as part of a mobile app displayed on a portable computing device 122 as illustrated in FIG. 1B.

This display similarly includes primary content 124 relating to an object of interest, as well as advertising content 126 and one or more recommendations 128. The content can be served, or otherwise received from, the same or different providers over the same or different networks. In determining which advertisements and/or recommendations to provide, it can be desirable in at least some embodiments to determine content that is likely to be viewed and/or objects that are likely to be consumed by a user based at least in part upon information known for the user. For example, in the situation where a user is browsing an electronic marketplace, content that is likely to be viewed and/or objects that are likely to be consumed can include accessories matching a color of an apparel item that the user is viewing. An accessory can be an item that can be worn along with an apparel item. An accessory can belong to one or more categories. Example accessory categories include jewelry (e.g., earrings, necklaces, rings, etc.), handbag (e.g., wallets, etc.), shoes, belts, sunglasses, watches, etc. Example apparel categories include women's dresses, men's shirts, boy's pants, girl's shirts, etc. In many embodiments there will be information about items or content that the user has viewed, searched, or consumed, among other such options. This can be combined with various other types of information in order to generate not only recommendations that are related to the content being viewed, but are also relevant to the user based upon what is known about the particular user. There are many algorithms and approaches used for processing such content to determine recommendations or suggestions to be displayed to a user.

It might be the case, however, that information about accessory items that match a color of an apparel item that the user is viewing is not available for use in generating such recommendations. For example, the electronic marketplace providing such recommendations may not have determined such information. Further, it also might be the case that information about the user is not available for use in generating the recommendations. For example, the user might be visiting the site for the first time, or might not have created an account, accepted a cookie, or performed/allowed another such action that could have enabled tracking information for a user. In some cases, the user might have an account but has not yet logged in to enable that account information to be correlated with that user for the current session, or the user might be using a device which does not include a tracking cookie or other such information. A user alternatively may have an account and allowed a tracking cookie or other such mechanism, but has so little data stored that the data has little impact on the recommendations. Various other scenarios exist whereby past user behavior, performance, or other such data is not available for the user on a current session. In both or either situation, recommendations generated for the user would be based on information that is not specific to the user, as may relate to the item being viewed as it relates to color or other features, data for the item category, information for other users having purchased or viewed the item, etc. These recommendations may have some value but will not take into account information for the specific user, which will prevent the recommendations from being as useful and relevant to the user as would otherwise be possible. Further, these recommendations may not take into appearance relationship information such as colors, patterns, textures, etc. between the various items provided by the electronic marketplace. This can negatively impact the user experience, reduce the likelihood of a conversion for the content provider or an advertiser, and can result in the user viewing additional pages or performing additional navigational steps to locate content of interest, which can result in extra consumption of resources such as bandwidth, memory, processing capacity, and the like.

Accordingly, approaches in accordance with various embodiments attempt to determine information that can help to produce more useful recommendations to be displayed in a situation where no, or little, information is available that indicates a relationship between content provided through an electronic marketplace or other content provider. In various embodiments, data available that relates to an item in a product catalog, for example color data, can be analyzed and aggregated in order to attempt to locate other items that are related and relevant to the item, at least as it relates to color and categorization of the content. Such approaches can include, for example, analyzing images, articles, and other sources of electronic content to attempt to locate items that might be relevant to the item of interest. In a clothing example, this can include accessory items that might be worn with an apparel item of interest, match the apparel item of interest, be frequently utilized or exhibited with the apparel item of interest, include a matching and/or complementary color to the apparel item of interest, etc.

For example, a set, stream, or other collection of image data (i.e., still images or video) can be analyzed to train classifiers that can be used to identify color and/or other features represented in the image data. A query image can be analyzed to attempt to determine representative color information of an apparel item of interest represented in the query image, and the color information can be compared to color information of other items such as accessory items that are contained within an electronic catalog of items to determine items that are determined to compliment or are otherwise associated the apparel item of interest. For example, users searching for apparel often buy accessories for items based on color and/or a relationship to the apparel searched for. Approaches provide for providing recommendations for accessories based on at least the accessories color and/or category, where the color of the accessory can complement and/or match the color of the apparel item and the category of accessory can complement the category of apparel. This can help to identify accessory items that may be worn with the apparel item of interest, such that they might also be of interest to a user who is viewing content about the apparel item of interest.

It should be noted that not everyone's taste is the same, and that there can be many different items worn or used together that may not appeal to a majority of users. Since the information is being aggregated across multiple sources and instances, the items that most frequently appear together can be weighted or ranked more highly (or associated more strongly with each other) than items that are rarely worn together. Further, certain sources might be weighted more highly than others. For example, items represented together in an image from a fashion magazine might be weighted more highly than items worn together in an uploaded user image or photo from a social networking site. Further, items worn together by a celebrity, professional athlete, musician, or other high profile person might be weighted higher for at least certain types of items, such as designer goods or jewelry. The response to recommendations presented to users can also be monitored over time, such that if no users select a recommendation for a particular item then that item can be weighted less or lowered in the rankings so that the recommendation shows less frequently, if at all.

As described, a person desiring to purchase a particular outfit or item of interest such as an apparel item might also desire other goods that are determined to match or at least compliment the item of interest, such as an accessory item in a complimentary color and/or category. In accordance with various embodiments, determining visually similar items based on color and/or other features to provide recommendations for display can be determined using a classifier trained to identify a color represented in an image to generate a feature descriptor that can be used to compare against a data store of feature descriptor to locate an appropriate item. The classifier can be trained using a convolutional neural network (CNN).

Convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set (which includes dress, pants, watches, earrings, necklaces, belts, sunglasses, among other apparel items and accessories), so it learns the best feature representation of a color represented for this type of image. The trained CNN is used as a feature extractor: input image is passed through the network and intermediate outputs of layers can be used as feature descriptor of the input image. Similarity scores can be calculated based on the distance between the one or more feature descriptors and the one or more candidate content feature descriptors and used for building relation graph.

A content provider can thus analyze a set of images and determine items that may be able to be associated in some way, such as clothing and apparel that may be worn together based on, for example, color represented in the image to find an accessory in a matching color to an apparel item. New images can be received and analyzed over time, with images having a decay factor or other mechanism applied to reduce weighting over time, such that newer trends and fashions are represented by the relations in the classifier. A classifier can then be generated using these relationships, whereby for any item of interest the classifier can be consulted to determine items that are related to that item in some way, such as clothing and apparel that may be worn together based on, for example, color being worn or used together by one or more users. Further, in accordance with various embodiments, the content provider can use the CNN to analyze a set of images, and determine all items that are worn together by a person in the image or, for example, between images. A relation table and/or graph can then be generated using these relationships, whereby for any item of interest the table or graph can be consulted to determine items that are related to that item in some way, such as being worn or used together by one or more users. For example, the table and/or graph can be used to identify which categories of accessories are most commonly worn and/or purchased along with apparel items from various categories. That is, when a user purchases a pair of pants, they might be looking for matching belts. Such relationships can further distinguish fine categories of accessories. For example, if a user purchases an expensive apparel item, fine or otherwise luxury accessories can be recommended rather than fashion accessories.

In any situation, the relationships can be weighted, scored, or have another appropriate value as discussed, which can be representative of the number of times those items appeared together, the type of person (i.e., celebrity or athlete) wearing those items, multiple color and/or patterns represented in the image, etc. The weightings can also be affected by whether they are items of the same type or style, or whether they are merely complementary items. These weightings or scores can be provided to a ranking algorithm that can also utilize other factors, such as item relatedness, common purchases or views by other users, or other such information, to generate relatedness scores for the items. The related items can then be ranked by score, for example, with content for a number of the highest ranked items being provided as recommendations along with the primary content for the item of interest. This information also can be used to select advertising that may be relevant for display with the primary content, as well as other types of related, complementary, or supplemental content.

In order to determine the items that are relevant to the item of interest, it can be desirable in at least some embodiments, to generate a robust color representation that can exclude background colors and skin-tones. For example, as described, a robust color representation is desirable in at least some embodiments, to identify relevant colors of apparel items represented in images. Such a process can include, for example, identifying and discarding a background of the images and excluding skin tone of a person wearing the apparel item. Such an approach might include identifying the portions of the image that correspond to a single person, as well as those that correspond to various items. This can involve any of a number of segmentation processes, which can be performed manually or automatically in various embodiments. Thereafter, a CNN can be used to learn a color descriptor used to identify relevant content as described further herein.

In a manual process, a person can cut, crop, or otherwise specify portions of an image that correspond to different items, such as apparel items, jewelry, and the like. The person can then manually attempt to identify the items, or can cause the designated portions to be analyzed by an object recognition algorithm, for example, where the person may first specify a category or type of item to minimize the search space, or the object recognition algorithm can do a full search against an entire search space, such as an electronic catalog.

In other embodiments, an automatic segmentation process can be used to analyze the various images and attempt to segment the image into portions corresponding to a single person or entity, individual objects or items in the image, or other such segments. One example approach to segmenting an image is illustrated in FIGS. 2A-2D. A first step of such an approach can involve removing background portions of the image or otherwise removing from consideration any portions of the image that do not correspond to an item of interest, in order to improve the accuracy of the results and lessen the amount of data to be analyzed. In the situation 200 of FIG. 2A, an image 200 is obtained that includes an item 202 that is contained in an electronic catalog, in this case the item being a dress being worn by a person and the dress is associated with a color. It should be understood that in some images a person might not be present, or only a portion of a person might be represented, among other such options. In the example situation 210 of FIG. 2B, a cropping process begins by starting at the corners and/or edges of the image and moving each side of a rectangle 212 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes.

Figure 2A:
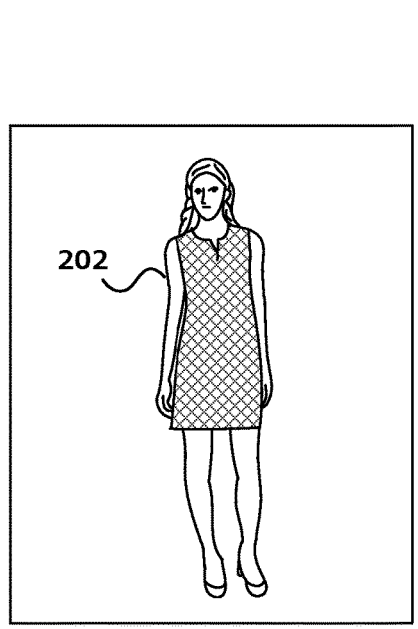
FIGS. 2A, 2B, 2C, and 2D illustrate example approaches for removing background from an image that can be utilized in accordance with various embodiments.
Figure 2B:
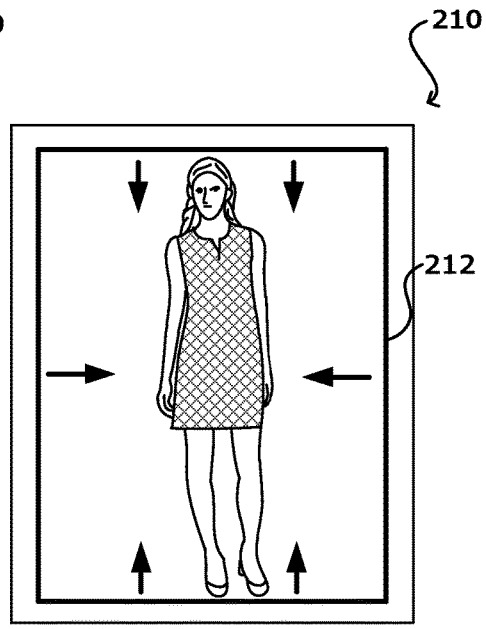
Figure 2C:
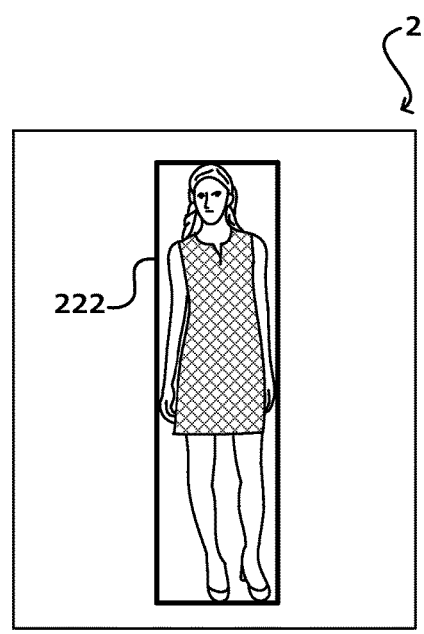

After each edge has stopped at an edge or contour of an object, a rectangularly-bound region 222 of the image will be determined that will include the item of interest, as illustrated in the example situation 220 of FIG. 2C. For images that contain models wearing various items, this can help reduce the search space to the items worn by a single person. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In example situation 230 of FIG. 2D, an outline or mask region 232 can be determined that then corresponds to the foreground (or background) portion of the image. This can be used to crop the image based on the location of the object, or can be used to expand the object to the appropriate aspect ratio, as discussed elsewhere herein.

Figure 2D:
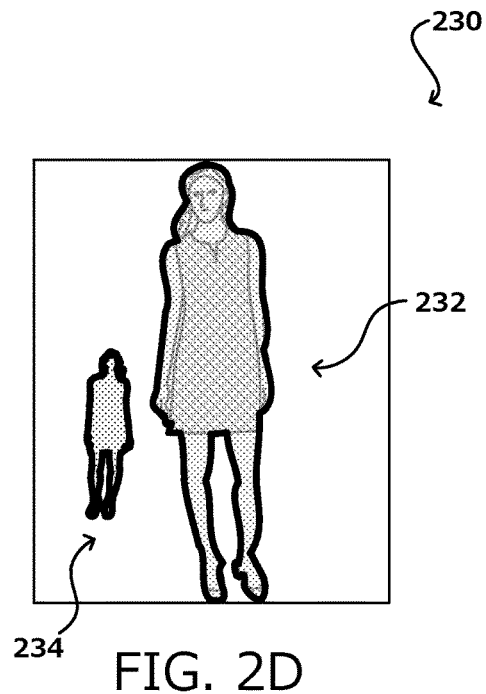

If the image includes multiple objects, such as a second person as illustrated in the example of FIG. 2D, the connected components analysis can still connect the background regions, which can result in determining a second object region 234 in the image. Various approaches can then either consider these objects together or as separate objects for purposes of cropping or image match. For images with multiple such object regions, one or more rules or policies could be utilized that indicate to select only the top region, most central region, largest region, etc.

Figure 3A:
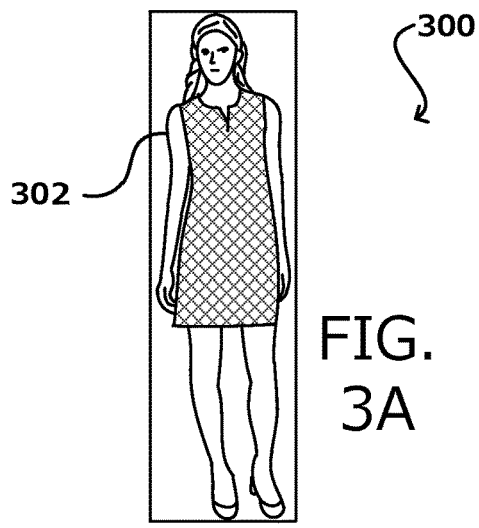
FIGS. 3A, 3B, and 3C illustrate an example approach to locating specific items represented in an image that can be utilized in accordance with various embodiments.
Figure 3B:
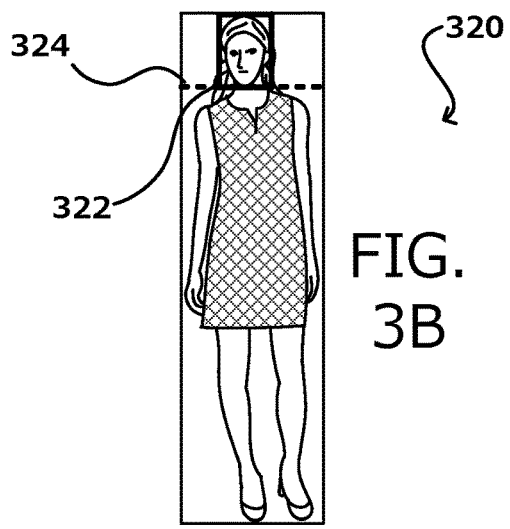

In at least some embodiments, a next portion of the process involves cropping the image based at least in part upon a location of a face of the wearer in the image. As illustrated in the example situation 300 of FIG. 3A, the input 302 can be the cropped image from FIG. 2D that has minimal background, although other versions of the image can be utilized as well within the scope of the various embodiments. From such an image, a face or head recognition process (i.e., a process using a Viola-Jones or deformable parts model (DPM)-based face recognition algorithm) can be used to attempt to locate a face or head in the image, at least in the upper portion (e.g., top half or quarter) of the image. As illustrated in the example situation 320 of FIG. 3B, a location or bounded region 322 identifying the location of such a face can be determined using an appropriate location algorithm as discussed elsewhere herein. From this region, an appropriate location for cropping can be determined. The appropriate location can depend at least in part upon the type of items to be recognized. For example, if the items include earrings and glasses then the location might be the top third of the person's head. If the items are only clothing, then the appropriate crop location might be at the bottom of the person's face, or just above the bottom in order to account for collars or other such features. If hats are to be considered then no cropping may be performed, but the location of the face may be used to segment out a potential hat portion of the image from the other portion of the image.

Figure 3C:
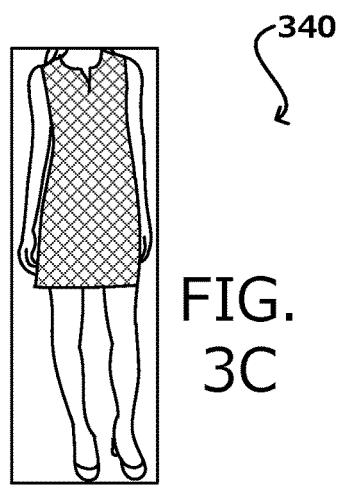

In this example, the location is the bottom of the head or face region in the up/down direction (in the figure). Such a point can be used to determine the new edge location 324 of the image, which passes through that point and parallel to the upper edge of the image (in the figure). It should be understood that terms such as "up" and "down" are used for purposes of explanation and that other arrangements or directions can be used as well within the scope of the various embodiments as appropriate. Using this edge location, the image can be cropped (or image data ignored) to remove the portion above that location, as illustrated in the example situation 340 of FIG. 3C. It should be understood, however, that processes other than traditional "cropping" can be used as well within the scope of the various embodiments. For example, pixels in the "cropped" or "cropped out" regions might have their values stored as metadata in the image, or set to an invisible or transparent setting, among other such options, such that the object appears to be cropped but the information is still in the image such that the original image can be recreated from the manipulated or "cropped" image if desired.

Figure 4A:
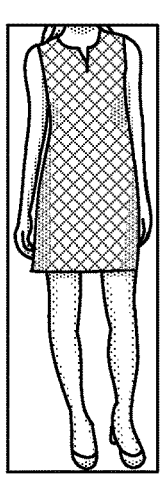
FIGS. 4A, 4B, and 4C illustrate an example approach to locating specific items represented in an image that can be utilized in accordance with various embodiments.
Figure 4B:
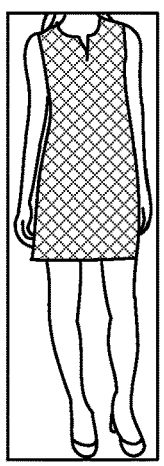
Figure 4C:

In this example, the cropped image can be used as input to the next portion of the process. In the example situation 400 of FIG. 4A, it can be seen that the cropped image is provided that will likely be a full color (e.g., 24 bit) image, or other such image with a conventional color depth. In order to locate the leg regions without utilizing a complex image recognition process, approaches in accordance with various embodiments can attempt to locate regions of skin color or skin tone that are positioned in a way that would be expected for legs in the image. The skin colors can have ranges of values that can depend at least in part upon the color space, color depth, etc. In order to improve accuracy, in at least some embodiments a version of the cropped image is produced, as illustrated in the example situation 410 of FIG. 4B, which is quantized, or has a reduced color depth. Reducing the color depth to, say, 256 bit color, can cause the skin regions to have less color variation and thus be more likely detected as contiguous regions of skin color. From the quantized image, the color of each pixel in the image can be analyzed to determine whether each pixel is, or is not, colored with a color that is within the range of skin tones. For pixels in that range, those pixels can be assigned a first value, such as 0. For pixels with colors outside the skin color range, those pixels can be assigned a second value, such as 1. The result will then be a mask image, such as is illustrated in the example situation 420 of FIG. 4C, wherein the regions of skin are identified with respect to the non-skin regions. For example, the leg and arm regions of the image are readily identifiable from the skin mask image.

Figure 5A:
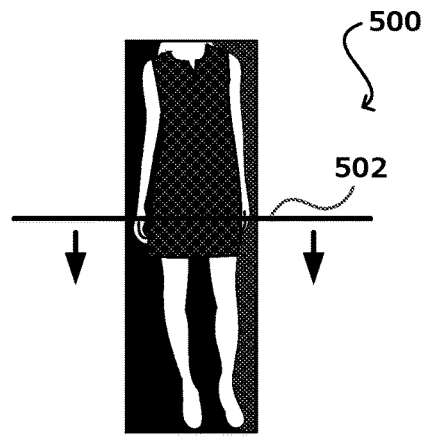
FIGS. 5A, 5B, 5C, 5D, 5E, and 5F illustrate an example approach to locating specific items represented in an image that can be utilized in accordance with various embodiments.

Once a skin mask (or similar binary version) is created, that image can be analyzed to attempt to determine the presence of legs in the image, as well of the positions of any such legs. For example, in the situation 500 of FIG. 5A a scan (represented by the scan line 502) can start at, or slightly above, the half-way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 510 of FIG. 5B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 512, 514 that appear on the same scan line and are separated by a non-skin region. Similarly, a second pair of skin regions is also designated by two segments 516, 518 that appear on the same scan line and are separated by a non-skin region. Based on the scanning of the mask alone, it would be difficult to say with certainty which of these scan line segments correspond to legs and which correspond to arms.

Figure 5B:
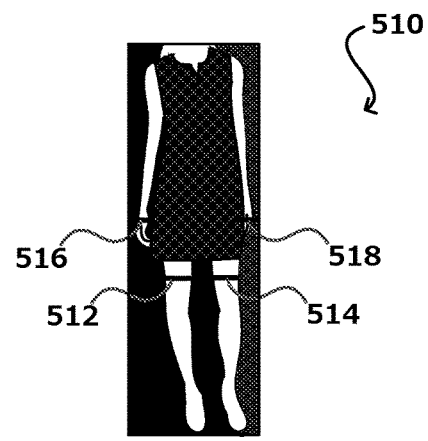
Figure 5C:
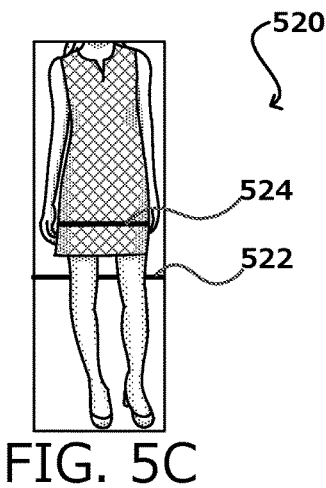
Figure 5D:
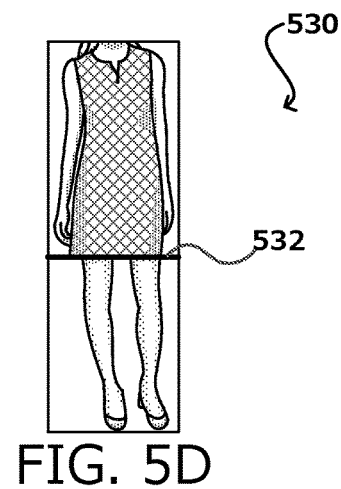

Accordingly, the process also utilizes a version of the image as illustrated in the situation 520 of FIG. 5C, which can be a full color, reduced color, or grayscale image, among other such options. In this example, the image is a grayscale image and areas of background can be distinguished from areas of non-background color. In this case, a set of scan line segments 522 corresponding to the first pair of segments 512, 514 in FIG. 5B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 524 corresponding to the second pair of scan line segments 516, 518 indicates that, based on the color value of the pixels along the scan line between the skin region, the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 532 as illustrated in the situation 530 of FIG. 5D. This may not be a precise determination due to the shape and deformability of the dress or skirt, but such precision may not be necessary for at least some embodiments. Once located, the image can be cropped to yield an image as illustrated in the situation 540 of FIG. 5E. If a connected components-based approach was used as discussed elsewhere herein, the determination of background pixels between the leg regions can improve the confidence of the determination.

Figure 5E:
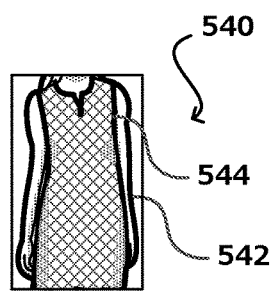
Figure 5F:
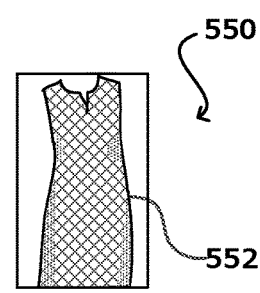

The image in the situation 540 of FIG. 5E is cropped top to bottom to approximately the location of an item of interest. From earlier steps, the contour 542 from the connected components analysis and a contour 544 from the skin tone region analysis can be used to further remove portions of the image from consideration. For example, any remaining points in the image outside the connected components contour 542 can be excluded from further analysis. Similarly, any points that were determined to correspond to regions of skin tone, inside a skin region contour 544, for example, can also be excluded, although as mentioned in some embodiments such an approach may not be used for image regions with a very high percentage of skin tone pixel values, or low deviation from skin tone, as that might correspond to a dress or other item having a color within the skin spectrum. If the skin tone and connected components contour are used to exclude points from consideration, the remaining image illustrated in the situation 550 of FIG. 5F will include pixel values almost exclusively that correspond to a region 552 of the item of interest. This can help to automatically generate an image of the item to be used with suggestions, for example, but also can enable the correct portion of the input image to be used for object identification or image matching, and will likely result in far more accurate results that matching against the entire image. While such an approach may not be as accurate as running the image through a very complex image analysis routine, the process will be much faster and require far fewer resources. If the image of FIG. 5F is run through an image match process and several possibilities show up with all with relatively low confidence scores, the image can be further analyzed to attempt to determine whether the region includes multiple items, such as a top and a skirt instead of a dress, such that the image portions for those items can be searched separately. This can be done, for example, by looking for different colors or patterns, doing an edge analysis, performing another connected components analysis, or performing another image segmentation process as discussed or suggested herein.

A segmentation process can thus be used to identify portions of an image that correspond to a color or pattern of a particular item, so feature information of the color or pattern of the item can be used to determine a matching accessory in an electronic catalog or other data repository. For example, if the object is a red dress, a search can be performed against data for visually similar accessories or other products, such as products with similar shapes, colors, patterns, textures, and other such aspects. By locating these similar objects the data for those objects can be aggregated and analyzed to determine a more accurate set of recommendations, or at least recommendations based on more data points.

Figure 6:
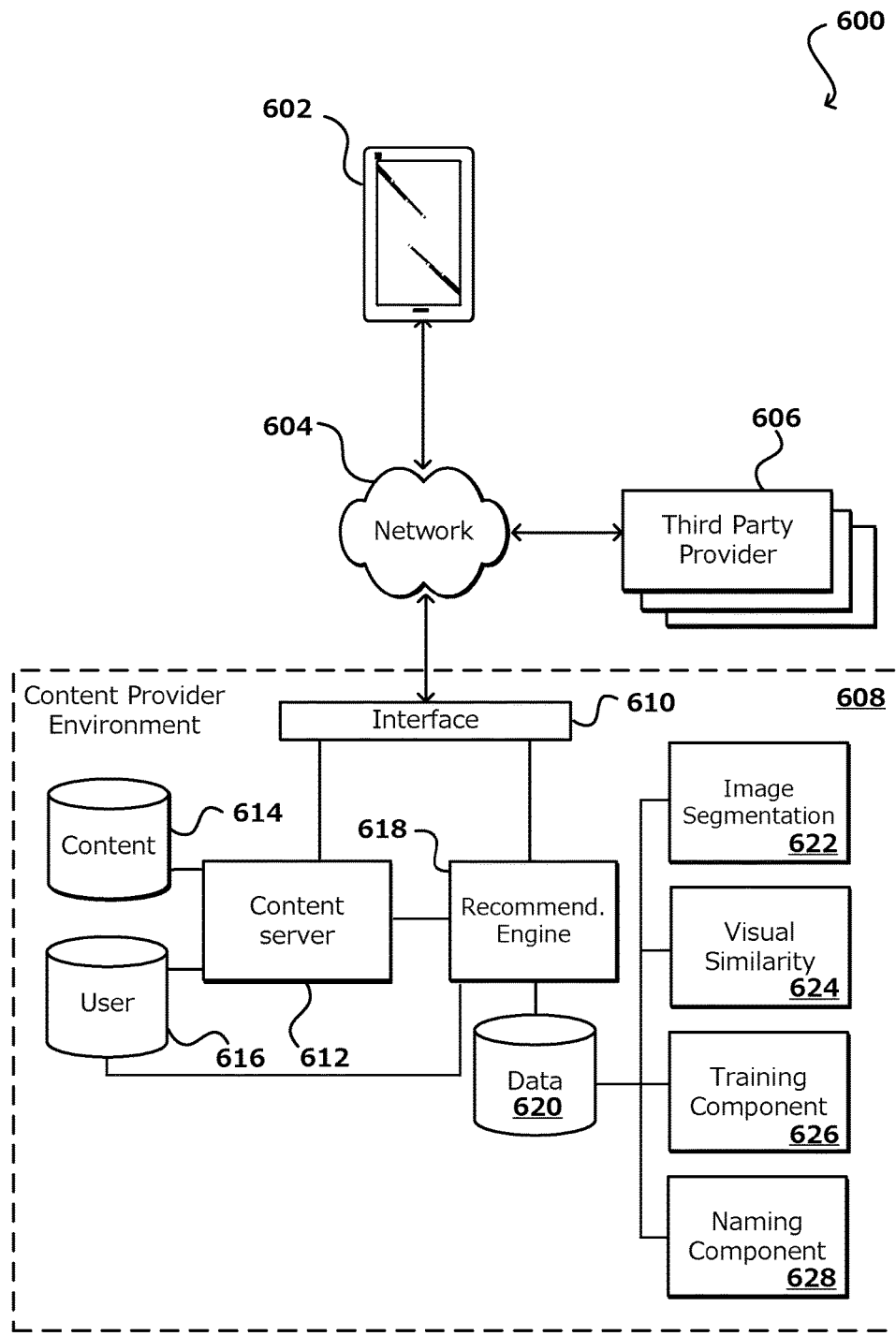
FIG. 6 illustrates an example environment for determining visually similar items that can be utilized in accordance with various embodiments.

In order to determine visually similar products such as an accessory item for an apparel item in at least some embodiments, some analysis of items in an electronic catalog or other data repository is performed in order to determine information about the visual characteristics of the items. In some embodiments, this involves the generation of one or more descriptors, such as color descriptors, that can be utilized for describing a color of a relevant apparel item in an image, while ignoring the background colors and skintones. Before describing approaches to using color descriptors to determine, for example, complementary accessories for an apparel item that match a color of the apparel item, it may be helpful to provide an example procedural context. FIG. 6 illustrates an example environment 600 in which various embodiments can be implemented. In this environment, images can be analyzed from various sources to attempt to determine information that can be used to locate items that may be able to be associated in some way, such as clothing that may be worn together, items that may be arranged together as part of a display, etc.

In this example environment, in accordance with various embodiments, a convolutional neural network (CNN) can be trained using images of apparel items that include metadata that includes, for example, labeled color data corresponding to color(s) of the apparel item, a description of the apparel item, a title of the apparel item, a category of the apparel, etc. In certain embodiments, training a CNN may involve significant use of computation resources and time, such that this may correspond to a preparatory step to servicing search requests and/or performed relatively infrequently with respect to search request servicing and/or according to a schedule. An example process for training a CNN for generating descriptors describing visual features of an image in a collection of images begins with building a set of training images. In accordance with various embodiments, each image in the set of training images can be associated with a color label describing a color of an item of interest represented in the image. According to some embodiments, training images and respective training color labels can be located in a data store 620 that includes images of a number of different items of interest, wherein each image can include metadata. The objects can include, for example, apparel items and accessory items. The metadata can include, for example, the title and description associated with the objects. The metadata can be used to generate color labels that can be used to label one or more primary colors represented in the image. For each image, image segmentation component 622 can segment the images, as described, for example, with respect to FIGS. 2-5 such that object represented in the image can be analyzed. Metadata associated with each image (or at least a portion of those images) is segmented into n-grams (i.e., set of words), and the n-grams are associated with a respective image.

In the next step, a naming, labeling, or other such component 628 can be utilized to select a set of color labels. Color labels can be words used to describe a color. For example, "teal" and "teal blue" are both color labels used to describe the color "teal." Determining color labels to label the collection of images includes, for example, obtaining a master list of colors and combining the colors listed in the master list of colors with color labels determined from the n-grams associated with each image into an initial color label set. A number of occurrences of each color label from the initial color label set can be determined. For each color label, a respective number of occurrences can be compared to a threshold. Color labels associated with a number of occurrences that a least meets the threshold are used to generate first draft list of color labels.

The next step is to clean up the first draft list of color labels to generate a working list of color labels. This can include, for example, removing words from color labels that have other meanings. For example, in the situation where the color label indicates that the color is "Company name" green, the words used to create the company name can be removed. In another example, color labels that more commonly describe other features of apparel can be removed. For example, the word "tulip" is used to describe a skirt shape more often than a color in certain apparel categories. In yet another example, color labels that describe essentially the same color can be combined. For example, a color label specifying the color golden can be combined with a color label specifying the color gold. Still yet another approach, color labels that are used interchangeably can be combined. For example, the color labels hot pink and fuchsia can be combined into, for example, the color label fuchsia. It should be noted that one or more of these approaches can be utilized to generate a working list of color labels. Further, in accordance with various embodiments, in an initial build phase, the working list of color labels can be further developed and refined as additional images are added to the collection of images. For example, this and other processes described herein can be repeated to update the working list of color labels after, for example, a predetermined number of images are added to the collection, after a predetermined period of time, a combination thereof, etc.

Once the working list of color labels is generated, the images in the collection of images are labeled using the list. For example, metadata associated with each image in the collection of images is compared to the color labels in the working list of color labels to determine any matches. In the situation where more than one match is determined for a given image, the set of possible color labels is reduced by selecting color labels that include, for example, the most number of words to identify a more descriptive color label to associate with the item represented in the image. For example, a more descriptive color label with two words like "navy blue" is given preference over a label with one word like "blue." In the situation where the set of possible color labels for a given image includes only one color label, the item represented in the image is labeled using that color label. In certain embodiments, in the situation where the set of possible color labels includes more than one color label, the image is discarded for the purpose of training. For example, an image that includes the color labels "black" and "blue" will be discarded. The approach results in determining a training data set that includes a subset of the images from the collection of images and an associated color label for each image.

A training component 626 can utilize the training data set (i.e., the images and associated color labels) to train a CNN. In accordance with various embodiments, a CNN can be used to determine color represented in an image by disregarding non-apparel elements like background and skin tone. In this way, the CNN can focus on, for example, the apparel color while learning to ignore any remaining background colors and the skin-tones in the image. The CNNs can also capture subtle variations between different shades of the same color. As further described, CNNs include several learning layers in their architecture. A query image from the training data set is analyzed using the CNN to extract a feature vector from the network before the classification layer. This feature vector describes the color of the relevant item represented in the image, while ignoring the background colors and skin-tones. This process can be implemented for each of the images in the data set, and the resulting color feature vectors can be stored in a data store.

In various embodiments, the resulting color feature vectors can be compressed for improved processing. For example, the color feature vectors generated by the CNN may include color feature vectors that have a large number of dimensions. The dimensions of these color feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

When a query is received, for example, a set of query color descriptors may be obtained or determined for the query image. For example, if the query image is not part of an electronic catalog and does not already have associated color descriptors, the system may generate color descriptors for the query content in a same and/or similar manner that the color descriptors are generated for the collection of images, as described. Also, for example, if the query image is part of the collection then the color descriptors for the query image may be obtained from the appropriate data store. The data store of color feature vectors can be searched to identify a set of candidate accessory color descriptors. Similarity scores can be calculated based on the distance between the one or more query color descriptors and the one or more candidate accessory color descriptors. A visual similarity component 624 or other such component can be used to search the collection of images to identify a set of images that are similar or at least complement the query image. Since color descriptors have been calculated or obtained for the query image, comparing images can be accomplished by comparing the color descriptors of query images to the color descriptors of the images of the collection. For example, distances may be determined between the local-texture, global-shape, and local-shape color descriptors of the query image and the local-texture, global-shape, and local-shape color descriptors of the images in the collection of images. According to some embodiments, dot product comparisons are performed between the color descriptors of the query image and the corresponding color descriptors of the images of the collection. The dot product comparisons are then normalized into similarity scores. Thus, between any two images, three similarity score are provided: (1) a similarity score between the local-texture color descriptors of the images; (2) a similarity score between the global-shape color descriptors of the images; and (3) a similarity score between the local-shape color descriptors of the images. After similarity scores are calculated between the different types of color descriptors of the images, the similarity scores can be combined. For example, the similarly scores may be combined by a linear combination or by a tree-based comparison that learns the combinations. For example, using a linear combination may provide the advantage of enabling a user to assign different weights to the different types of color descriptors, thereby causing the search module to consider the weighting when selecting the nearest content colors. It should be appreciated that instead of a dot product comparison, any distance metric could be used to determine distance between the different types of color descriptors, such as determining the Euclidian distance between the color descriptors.

After the combined similarity scores are determined, a set of nearest color descriptors may be selected. For example, the search module may select a subset of content color descriptors associated with images of the collection that are nearest the query color descriptors as determined by the combined similarity scores. Images in the collection associated with the subset of nearest color descriptors may be provided for analysis and/or presentation. For example, the search module may determine images in the collection that match the set of nearest content color descriptors selected at step and provide at least reference to the matching images. As mentioned, in various embodiments the references can be used with a recommendations component 618 to generate recommendations for a user based on information known or obtainable with respect to the items for the matching images.

In accordance with various embodiments, the recommendation component can be used to determine which categories of accessories that are most commonly purchased along with apparel from various categories. For example, when a user purchases a pair of pants, matching belts can be recommended to the user. In another example, when a user purchases a dress, complementary earrings or necklaces can be recommended to the user. In at least some embodiments, it might be desirable to distinguish fine categories of accessories. For example, if a user purchases an expensive cocktail dress fine earrings rather than fashion earrings might be recommended to the user.

In order to determine categories of accessories that are most commonly purchased along with apparel from various categories in at least some embodiments, some analysis of items in an electronic catalog or other data repository is performed in order to determine something about the visual characteristics of the items. In this example, input variables can include a set of categories of apparel items. One of more of these categories can be set for any training or query example. The outputs can be a set of categories of accessory items and should be categories most likely to be purchased along with the input apparel item. These category variables will have higher values than the other category variables in the labeled training data. In accordance with various embodiments, determining these categories can be based at least in part on user behavior. For example, user behavior with respect to various items provided through an electronic marketplace can be determined in order to calculate a probability that a user was searching for a particular type of item for a given search. The user behavior can include historical action data, such as information that indicates items that were selected in response to a particular search and/or items that were purchased in response to a particular search. The historical action data can be analyzed to generate an index that maps searches to one or more types of products, where each of these mappings is associated with a probability that indicates the likelihood that the search was intended for a particular type of product. Additionally, the historical data can be used to train any machine learning tool such as a decision trees/forests, SVMs, deep networks, etc. After the training phase, the trained system can be used to predict which category (or categories) of accessory items should be recommend for a particular item of apparel.

In a post processing aspect of the environment, a user is able to use a client device 602 to submit a request for content, such as a webpage or page of an electronic book, across at least one network 604. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others.

The at least one network 604 can include any appropriate network, such as may include the Internet, an Intranet, a local area network (LAN), a cellular network, a Wi-Fi network, and the like. The request can be sent to an appropriate content provider environment 608, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 610 of the content provider environment 608. The network interface layer can include any appropriate components known or used to receive requests from across a network, such as may include one or more application programming interfaces (APIs) or other such interfaces for receiving such requests. The network interface layer 610 might be owned and operated by the provider, or leveraged by the provider as part of a shared resource or "cloud" offering. The network interface layer can receive and analyze the request from the client device 602, and cause at least a portion of the information in the request to be directed to an appropriate system or service, such as a content server 612 (e.g., a Web server or application server), among other such options. In the case of webpages, for example, at least one server 612 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 616 that contains information about the various users, and one or more content repositories 614 storing content able to be served to those users.

As mentioned, in at least some embodiments the content to be provided can include data 620 for one or more recommendations, advertisements, or other such elements that are selected based on information for the user associated with the request, for example by providing information to a recommendation engine 618 or other such component or service, for analyzing the provided information and attempting to generate recommendations or other elements as discussed herein. In some embodiments, this can utilize content generated within the content provider environment 608 or received from one or more third party providers 606, among other such options. For example, a category of images can be generated using images captured within the environment or received from the third party providers 606. As mentioned, an image segmentation system 622 or other such component or service can analyze the images to attempt to determine portions of those images that correspond to individual items that have data stored in the content repository 614 or elsewhere in the content provider environment 608. This can include, for example, images of items available for consumption. The environment can also include a visual similarity system 624, or other such component or service, for analyzing the image portions for the individual items and attempting to locate content for similar items that are at least somewhat visually similar. Again, this can include comparing the image portions, or data for those portions, against image data stored for items in the catalog. Based at least in part upon this information, the recommendation component, or other such system, service, or component, can attempt to items that may be able to be associated in some way, such as clothing that may be worn together, items that may be arranged together as part of a display, etc.

Figures 7A, 7B:
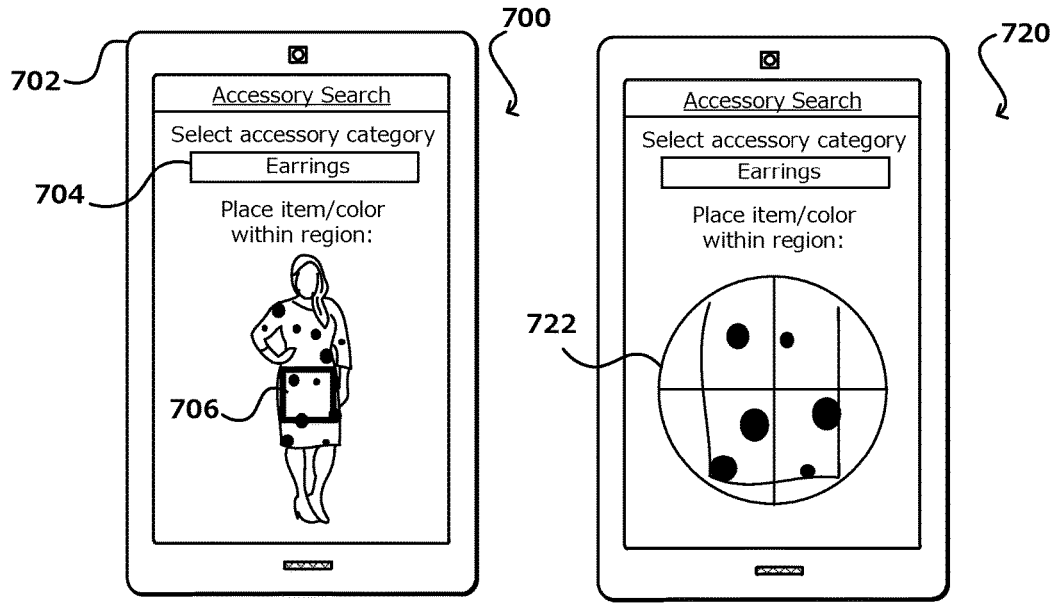
FIGS. 7A, 7B and 7C illustrate examples of an approach to display content including recommendations that can be provided in accordance with various embodiments.
Figure 7C:
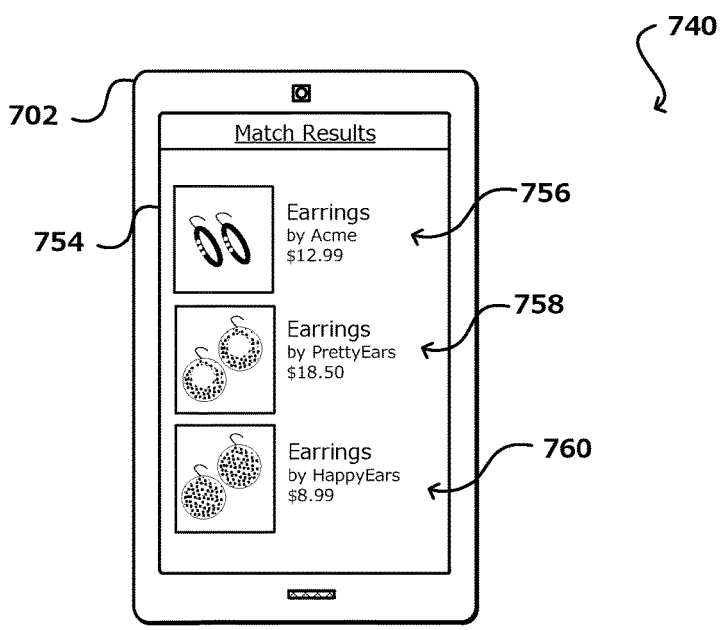

FIGS. 7A-7C illustrates example 700 of selecting portions of apparel to which an accessory is desired to match in accordance with various embodiments. As described, when a query is received, a set of query color descriptors may be obtained or determined for the query image. For example, if the query image is not part of an electronic catalog and does not already have associated color descriptors, the system may generate color descriptors for the query content in a same and/or similar manner that the color descriptors are generated for the collection of images, as described. Also, for example, if the query image is part of the collection then the color descriptors for the query image may be obtained from the appropriate data store. In certain embodiments, a user operating a portable computing device can select portions of an image that correspond to different items, such as apparel items, jewelry, and the like, and the specified portions can be analyzed to determine the set of query color descriptors.

For example, FIG. 7A illustrates an example situation 700 where a user can select a portion of an image, and that portion of the image can be analyzed to determine a set of query color descriptors. In this example, an image 702 is obtained that includes a representation of a woman wearing a dress. It can be the case that a user likes the dress and wants to locate information about that dress, or likes the pattern of the dress and wants to locate other items, such as accessory items, that have a similar color and/or pattern. Attempting to match against the entire image can be difficult as the features of the image that would be used for a conventional image search can include feature points relating to not only the dress, but also the person wearing the dress and other such feature points. In this example, a user can select a category 704 of accessories that they desire to search in to determine matching accessories. As shown in FIG. 7A, the user has selected to search for earrings that include a similar color and/or pattern what is within region 706. The user can select other regions by tapping, panning, or otherwise interacting with the display of the user's computing device to select a desired region of the image. In various embodiments the user can zoom in and/or out of the image and/or otherwise pan the image until the user decides on a portion of the image having the desired color and/or pattern. As is known in the art, various gestures can be used to zoom and/or pan an image. Further, various interface elements can be enabled to perform such actions. As shown in example 720 of FIG. 7B, the user has zoomed in using a magnifying or other tool 722 to select a specific color and/or pattern on the dress. An application executing on the device (or otherwise in communication with the device) can analyze the selected portion using approaches described herein to determine a set of query color descriptors that represent a color and/or pattern of the selected area. The data store of color feature vectors corresponding to the accessory category earrings can be searched to identify a set of candidate accessory color descriptors. Similarity scores can be calculated based on the distance between the one or more query color descriptors and the one or more candidate accessory color descriptors. A set of nearest accessory color descriptors may be selected. Content in the collection associated with the subset of nearest accessory color descriptors selected may be provided for presentation, resulting in a presentation of content from the collection that is similar to the query image, as shown in example 740 of FIG. 7C. As shown in FIG. 7C, accessories have been identified based on the selected region. In this example, the results illustrated on the display 754 of the computing device match the selected portion of the image. If the user is interested in items matching the pattern of the dress, earrings 758 and 760 of the displayed results and bracelet 756 will be relevant. It should be noted that, although dresses are used as an example, various other types of items or objects, apparel related or not, can benefit from aspects of the various embodiments as should be apparent in light of the teachings and suggestions contained herein.

Figure 8:
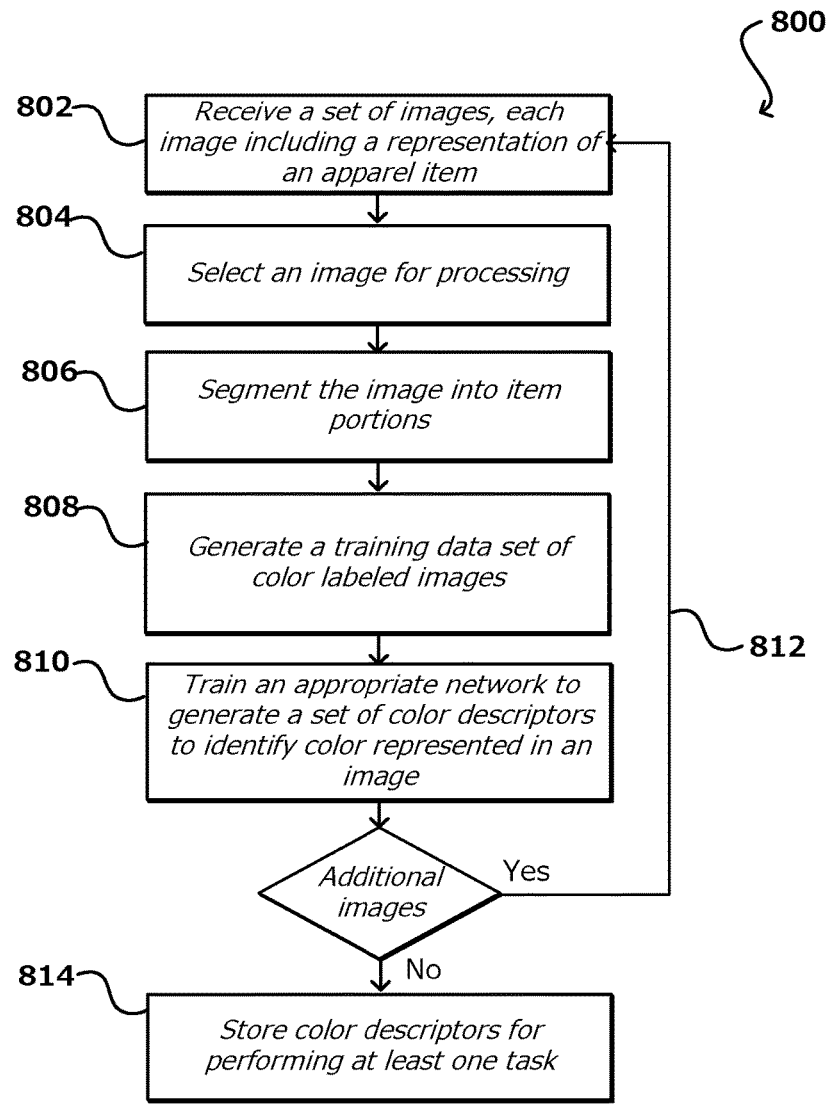
FIG. 8 illustrates an example process for generating descriptors that can be utilized in accordance with various embodiments.

FIG. 8 illustrates an example process 800 for generating feature descriptors that can be utilized in accordance with various embodiments. It should be understood that there can be additional, fewer, or alternative steps performed in similar or alternative orders, or in parallel, within the scope of the various embodiments unless otherwise stated. In order to determine visually similar products such as an accessory for an apparel item in at least some embodiments, some analysis of items in an electronic catalog or other data repository provided through an electronic marketplace is performed in order to determine information about the visual characteristics of the items. In some embodiments, this involves the generation of one or more descriptors, such as color descriptors, that can be utilized for describing a color of an apparel item represented in an image. In this example, a set of images is obtained 802, each image including a representation of an apparel item. The set can include subsets of images from different sources and/or received at different times. Further, the collections may include formal collections or other grouping of items contained in a single image, such as may be worn or used by a person represented in one of the images. The images may also include metadata regarding that which is represented in the images, such as may include item descriptions or identifiers, location information, collection data, person or model information, color information, and the like. The images can be stored to a data store or in memory for subsequent analysis.

From the set of images, an image can be selected 804 for processing. This can include any pre-processing, such as noise removal, color or intensity adjustment, and the like. The image can then be segmented 806 into item portions using any of the processes discussed or suggested herein, to identify a potential item of interest. As discussed, the segmentation process can be used to identify portions of an image that correspond to a color or pattern of a particular item, so feature information of the color or pattern of the item can be used to determine a matching accessory in an electronic catalog or other data repository.

A color labeling or similar process can attempt to identify a representative color of the item of interest to generate 808 a training data set of color labeled images. As discussed, this can include, for example, first determining a set of color labels. Color labels can be words used to describe a color. For example, "teal" and "teal blue" are both color labels used to describe the color "teal." Determining color labels to label the collection of images includes, for example, obtaining a master list of colors and combining the colors listed in the master list of colors with any color labels associated with each image into an initial color label set. A number of occurrences of each color label from the initial color label set can be determined. For each color label, a respective number of occurrences can be compared to a threshold. Color labels associated with a number of occurrences that a least meets the threshold are used to generate first draft list of color labels. The next step is to clean up the first draft list of color labels to generate a working list of color labels. This can include, for example, removing, combining, and/or substituting words from the first draft list of color labels. Once the working list of color labels is generated, the images in the collection of images are labeled using the list to generate the training data set that includes images and a label specifying a color of an item represented in a respective image.

A training component or other such component can utilize the training data set to train 810 an appropriate network such as a CNN to generate a set of color descriptors to identify color represented in an image. This can include using the trained network to generate various color descriptors in some embodiments that can be compared against color descriptors for other items to attempt to identify items with similar visual aspects. If there are more images 812 the process can continue, otherwise the color descriptors can be provided and/or stored 814 for use in making recommendations, selecting advertising, or performing other such tasks. For example, an image of an item of interest can be analyzed to determine visually similar items from an electronic catalog (or another such source).

Figure 9:
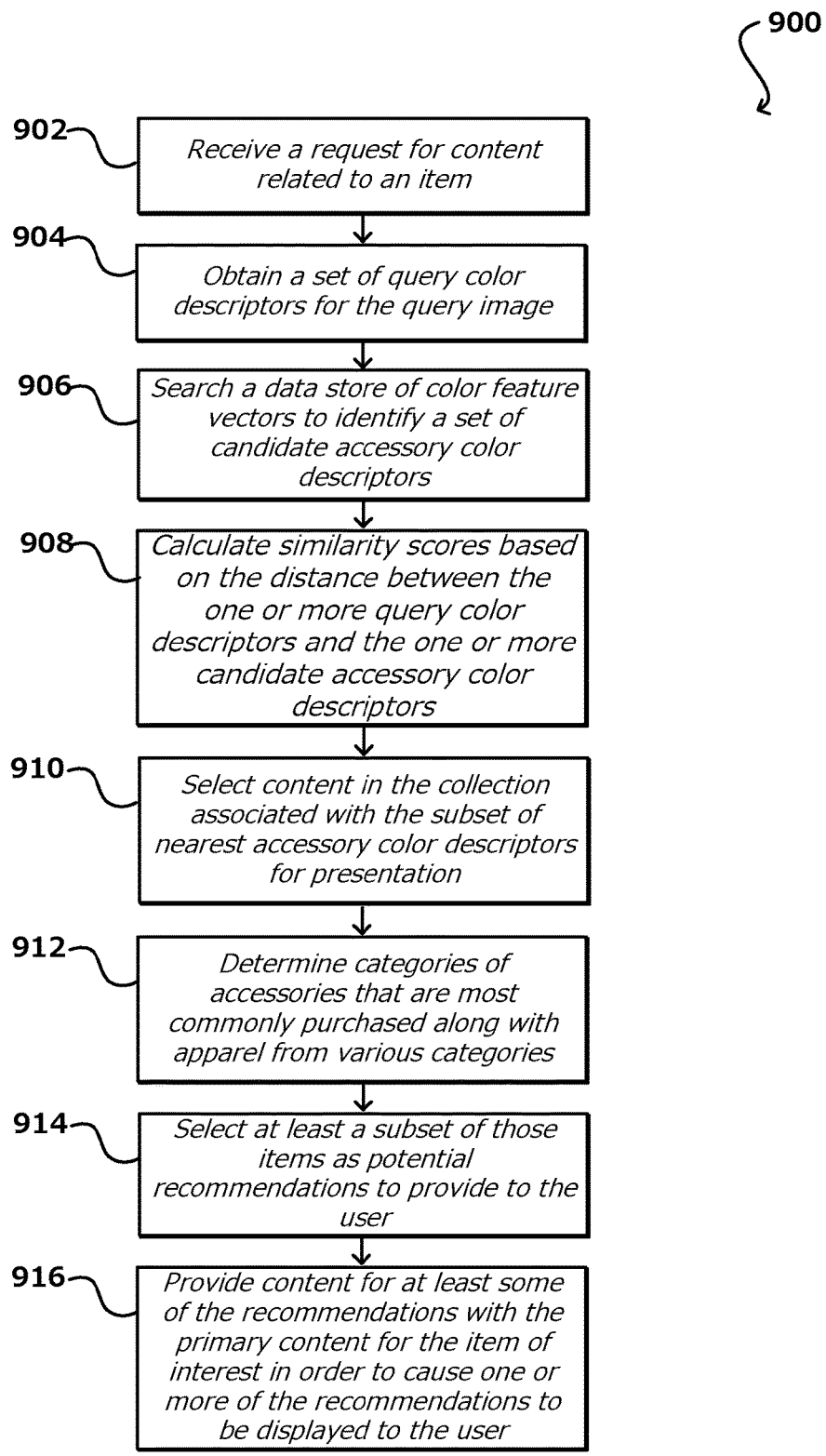
FIG. 9 illustrates an example process for determining recommended content that can be utilized in accordance with various embodiments.

FIG. 9 illustrates an example process 900 for generating recommendations using descriptors such as those created in the process of FIG. 8. In this example, a request for content related to a particular item is received 902. The request can be received in response to a search query for the item being received, a navigation to a page associated with the item, or another such action or occurrence. A set of query color descriptors may be obtained or determined 904 for the query image. As discussed, if the query image is not part of an electronic catalog and does not already have associated color descriptors, the system may generate color descriptors for the query content in a same and/or similar manner that the color descriptors are generated for the collection of images, as described. Also, for example, if the query image is part of the collection then the color descriptors for the query image may be obtained from the appropriate data store.

The data store of color feature vectors can be searched 906 to identify a set of candidate accessory color descriptors. As mentioned, the candidate color descriptors are associated with accessory items provided through an electronic marketplace. Similarity scores can be calculated 908 based on the distance between the one or more query color descriptors and the one or more candidate accessory color descriptors. As discussed, the distances with respect to the metric of the descriptor space in which the query color descriptors and the accessory color descriptors are located (e.g., as points or vectors) can be determined. A set of nearest accessory color descriptors may be selected. For example, the search module may select a subset of the candidate accessory content descriptors nearest the query color descriptors with respect to the similarity scores. Content in the collection associated with the subset of nearest accessory color descriptors selected can be selected 910 for presentation, resulting in a presentation of content from the collection that is similar to the query image.

Categories of accessories that are most commonly purchased along with apparel from various categories can be determined 912. As mentioned, information for the user may be available in some situations. If so, additional results can be determined using any reasonable item recommendation process, such as those known or used in the art for making recommendations for display with an item or content based on information for that item or content as well as information available for the user, such as purchase or view history and the like. In some embodiments only items that appear together in images more frequently than may occur naturally or randomly, or are otherwise associated more strongly from the graph than random objects, can be considered for inclusion in a set of potential recommendations. The results from using the descriptors can be combined with the results based on user history data or other such information to generate a pool of potentially related items.

At least a subset of those items can be selected 914 as potential recommendations to provide to the user. The subset can be selected based upon a number of criteria, such as relatedness scores, occurrence scores, item type or category, item and/or request location, item availability, and other such criteria. For example, a user looking at clothing items in Hawaii might get different recommendations that a user looking at the same items in Iceland based upon different types of items being worn with that item in that location based on the received images. Content for at least some of the recommendations can then be provided 916 with the primary content for the item of interest in order to cause one or more of the recommendations to be displayed to the user.

An advantage to such an approach is that recommendations will be selected and presented that can more likely be of interest to a user by providing recommendations for accessories based on at least the accessories color and/or category, where the color of the accessory can complement and/or match the color of the apparel item and the category of accessory can complement the category of apparel. This can help to identify accessory items that may be worn with the apparel item of interest, such that they might also be of interest to a user who is viewing content about the apparel item of interest. This can help to reduce the amount of time the user needs to spend searching for items, and the number of pages or searches needed to be examined in order to find those items, which can reduce the amount of resources needed for that user session. Aspects of the present invention thus not only improve the user experience but also improve the performance of various computer systems as the amount of power, processing capacity, bandwidth, memory, and other resources needed for the session can be reduced, and the performance of the system for this and other users, as well as this and other tasks, improved.

Figure 10:
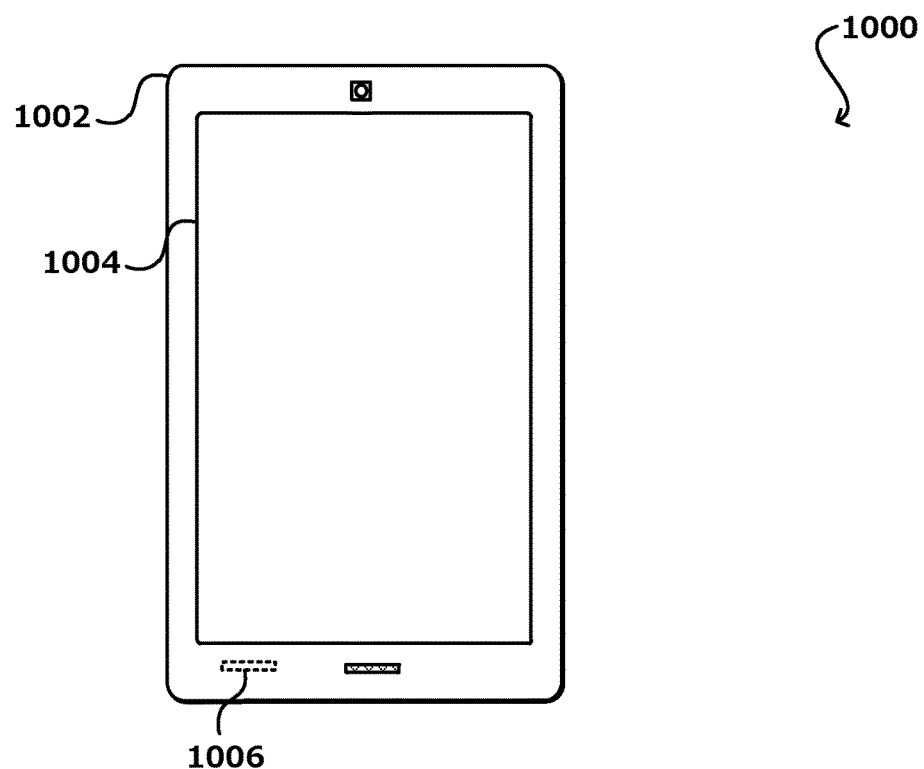
FIG. 10 illustrates an example device that can be used to implement aspects of the various embodiments.

FIG. 10 illustrates an example electronic user device 1000 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1002 has a display screen 1004 on the front side, which under normal operation will display information to a user facing the display screen (e.g., on the same side of the computing device as the display screen). It should be understood that computing devices such as servers, however, may not have dedicated display elements. The example computing device 1000 also includes at least one networking component 1006, such as a network interface card, wireless networking component, and the like, enabling the computing device to communicate information over at least one network.

Figure 11:
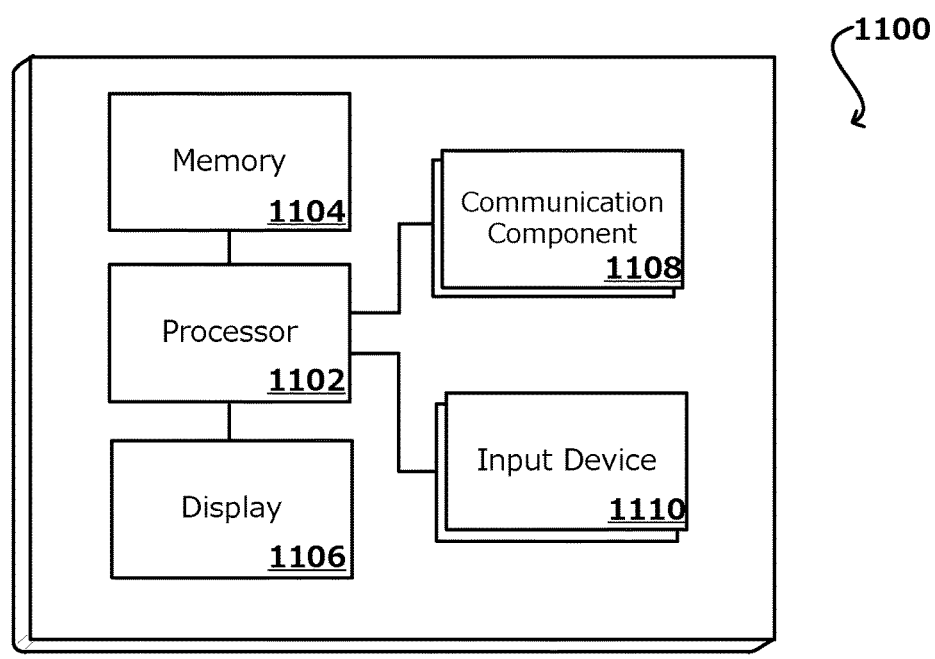
FIG. 11 illustrates example components of a client device such as that illustrated in FIG. 10.

FIG. 11 illustrates a logical arrangement of a set of general components of an example computing device 1100 such as the device 1000 described with respect to FIG. 1000. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. In some embodiments, the computing device 1100 of FIG. 11 can include one or more networking and/or communication elements 1108, such as a Wi-Fi, Bluetooth, RF, wired, or wireless communication system. The device in many embodiments can communicate with a network, such as the Internet, and may be able to communicate with other such devices. In some embodiments the device can include at least one additional input component 1110 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a computing device processor;
   a memory device including instructions that, when executed by the computing device processor, cause the computing device to:
   obtain an image including a representation of an object, the object including an apparel item worn by a person;
   locate a representation of a face and a representation of one or more legs in the image;
   crop the image, from an upper edge of the image, to remove a specified portion of the representation of the face from the image to generate a first cropped image;
   crop the image, from a lower edge of the image, to include only a specified portion of the representation of one or more legs in the image to generate a second cropped image;
   quantize the second cropped image into a set of pixels each including pixel metadata, the pixel metadata including at least a respective color value representing a color feature of the representation of the apparel item;
   generate and store a color list including the respective color value associated with the pixel metadata of each pixel in the set of pixels;
   receive a request for content relating to an apparel item of interest, the apparel item of interest associated with an apparel category type;
   determine one or more color features of the apparel item of interest based at least in part on the respective color value in the color list;
   compare, based at least in part on the respective color value in the color list, the one or more color features against an electronic catalog of color feature representations to identify visually similar items;
   determine, from the visually similar items and based at least in part on the apparel category type, a set of accessory items to the apparel item of interest; and
   provide, with primary content for the apparel item of interest including at least a subset of the visually similar items, supplemental content for at least a subset of the set of accessory items to the apparel item of interest.

2. The computing device of claim 1, wherein the instructions, when executed further enable the computing device to:
   obtain a first set of images, each image of the first set of images including a representation an apparel item, at least a portion of the first set of images associated with first metadata identifying a color name of a color represented in a respective image of the portion of the first set of images;
   associate, for each image of the portion of the first set of images, a respective color name with a corresponding image;
   obtain a second set of images, each image of the second set of image including a representation of a fashion accessory, at least a portion of the second set of images associated with second metadata identifying a color name of a color represented in a respective image of the portion of the second set of images;
   associate, for each image of the portion of the second set of images, a respective color name with a corresponding image; and
   generate a list of color labels based at least in part on the color name identified in respective first metadata of each image of the first set of images and the color name identified in respective second metadata of each image of the second set of images.

3. The computing device of claim 2, wherein the instructions, when executed further enable the computing device to:
   associate, for each image of the portion of the first set of images and the second set of images, a color name from the list of color labels to generate a training set of images with associated color labels; and
   train, using the training set of images with associated color labels, a classifier to determine at least one color in image.

4. A computing device, comprising:
   a computing device processor;
   a memory device including instructions that, when executed by the computing device processor, cause the computing device to:
   obtain an image that includes a representation of an object;
   generate a cropped image including the representation of the object, the cropped image excluding, relative to the image, at least one specified portion of the image corresponding to at least one location of pixels that does not include the representation of the object;
   quantize the cropped image into a set of pixels each including pixel metadata, the pixel metadata including at least a respective color value representing a color feature of the representation of the object;
   generate and store a color list including the respective color value associated with the pixel metadata of each pixel in the set of pixels;
   receive a request for content relating to an item of interest represented in a query image;
   determine color features of the item of interest based at least in part on the respective color value in the color list;
   compare, based at least in on the respective color value in the color list, the color features of the item of interest against an electronic catalog of color feature representations to identify visually similar items; and
   determine, from the visually similar items, at least one item related to the item of interest.

5. The computing device of claim 4, wherein the instructions, when executed further enable the computing device to:
   determine a location of a representation of a head in the image;
   use at least one of a face detection algorithm or a head detection algorithm to detect a presence of a representation of a head in the image; and
   determine a portion of the representation of the head to exclude based at least in part on a visibility criterion.

6. The computing device of claim 4, wherein the instructions, when executed further enable the computing device to:
   process, with a classifier algorithm, a set of feature values for locations having skin tone color values;

determine a location of a representation of one or more legs in the image, the representation of the one or more legs corresponding to pixels having the skin tone color values; and exclude, relative to the image, a portion of the representation of the one or more legs in the image.

7. The computing device of claim 4, wherein the instructions, when executed further enable the computing device to:

obtain a first image from an electronic catalog of items, the first image including a representation an apparel item and being associated with first metadata identifying a first color label of a color represented in the first image;

associate the first color label with the first image;

obtain a second image from the electronic catalog of items, the second image including a representation of a fashion accessory, the second image associated with second metadata identifying a second color label of a color represented in the second image;

associate the second color label with the second image; and generate a first list of color labels that includes at least the first color label and the second color label.

8. The computing device of claim 7, wherein the instructions, when executed further enable the computing device to:

obtain a catalog list of color labels;

combine the first list of color labels and the cataloged list of color labels to generate a combined list of color labels;

determine a number of occurrences of each color label in the combined list of color labels; and generate a second list color labels that includes color labels associated with a respective number of occurrences that at least meets a threshold.

9. The computing device of claim 8, wherein the instructions, when executed further enable the computing device to:

generate a third list of color labels corresponding to a working list of color labels by performing at least one of: removing words that have dual meanings, removing color labels associated with features of apparel, combining color labels that describe a substantially similar color, or combine color labels that are used interchangeably in the electronic catalog of items.

10. The computing device of claim 4, wherein the instructions, when executed further enable the computing device to:

obtain a plurality of images from an electronic catalog of items, a subset of images of the plurality of images being associated with respective metadata identifying at least a title and a color label of a color represented in a respective image;

compare, for a first image of the subset of images of the plurality of images, first metadata associated with the first image to a working list of color labels to identify one or more matching color labels;

determine, for the first image, a color label from the one or more matching color labels having a greatest number of words; and generate a set of color labels that includes the color label.

11. The computing device of claim 10, wherein the instructions, when executed further enable the computing device to:

train a classifier using at least the plurality of images and the set of color labels to generate a color label corresponding to a representative color of a representation of an apparel item in a query image.

12. The computing device of claim 11, wherein analyze a first image of the plurality of images using a classifier algorithm, the first image including a representation of an object;

determine a set of feature values associated with the representation of the object, the set of feature values representative of one or more colors associated with the representation of the object; and store the set of feature values in a data store.

13. The computing device of claim 4, wherein the instructions, when executed further enable the computing device to:

identify a plurality of queries for items provided through an electronic marketplace;

determine historical action data based at least in part on the plurality of queries, the historical action data indicating at least one of an item selected in response to a particular query or an item purchased in response to the particular query; and analyze the historical action data to generate an index that maps each query of the plurality of queries to at least one accessory type.

14. The computing device of claim 13, wherein receive a query for an apparel item offered through the electronic marketplace;

identity a product type associated with the apparel item; and analyze the index to determine at least one accessory type.

15. The computing device of claim 4, wherein the instructions, when executed to receive the request for content relating to the item of interest further enable the computing device to:

receive, from a mobile device interface, a swatch region, the swatch region corresponding to a subset of pixels of the query image determined to correspond to the item of interest.

16. A method, comprising:

obtaining an image that includes a representation of an object;

generating a cropped image including the representation of the object, the cropped image excluding, relative to the image, at least one specified portion of the image corresponding to at least one location of pixels that does not include the representation of the object;

quantizing the cropped image into a set of pixels each including pixel metadata, the pixel metadata including at least a respective color value representing a color feature of the representation of the object;

generating and storing a color list including the respective color value associated with the pixel metadata of each pixel in the set of pixels;

receiving a request for content relating to an item of interest represented in a query image;

determining color features of the item of interest based at least in part on the respective color value in the color list;

comparing, based at least in part on the respective color value in the color list, the color features of the item of interest against an electronic catalog of color feature representations to identify visually similar items; and determining, from the visually similar items, at least one item related to the item of interest.

17. The method of claim 16, further including:

obtain a first image from an electronic catalog of items, the first image including a representation an apparel item and being associated with first metadata identifying a first color label of a color represented in the first image;
associate the first color label with the first image;
obtain a second image from the electronic catalog of items, the second image including a representation of a fashion accessory, the second image associated with second metadata identifying a second color label of a color represented in the second image;
associate the second color label with the second image; and
generate a first list of color labels that includes at least the first color label and the second color label.

18. The method of claim 17, further including:
obtain a catalog list of color labels;
combine the first list of color labels and the cataloged list of color labels to generate a combined list of color labels;
determine a number of occurrences of each color label in the combined list of color labels;
generate a second list color labels that includes color labels associated with a respective number of occurrences that at least meets a threshold; and
generate a third list of color labels corresponding to a working list of color labels by performing at least one of: removing words that have dual meanings, removing color labels associated with features of apparel, combining color labels that describe a substantially similar color, or combine color labels that are used interchangeably in the electronic catalog of items.

19. The method of claim 16, further comprising:
obtain a plurality of images from an electronic catalog of items, a subset of images of the plurality of images being associated with respective metadata identifying at least a title and a color label of a color represented in a respective image;
compare, for a first image of the subset of images of the plurality of images, first metadata associated with the first image to a working list of color labels to identify one or more matching color labels;
determine, for the first image, a color label from the one or more matching color labels having a greatest number of words; and
generate a set of color labels that includes the color label.

20. The method of claim 19, further comprising:
train a classifier using a plurality of images and the set of color labels to generate a color label corresponding to a representative color of a representation of an apparel item in a query image;
analyze a first image of the plurality of images using a classifier algorithm, the first image including a representation of an object;
determine a set of feature values associated with the representation of the object, the set of feature values representative of one or more colors associated with the representation of the object; and
store the set of feature values in a data store.

* * * * *